United States Patent [19]

Kawate et al.

[11] 4,442,706

[45] Apr. 17, 1984

[54] PROBE AND A SYSTEM FOR DETECTING WEAR OF REFRACTORY WALL

[75] Inventors: Yoshio Kawate, Toyonaka; Nobuyuki Nagai; Takefumi Horiuchi, both of Kobe; Saburo Tsurutani, Kawanishi; Minoru Kitamura, Nishinomiya; Shuzo Ito, Kobe; Masahiko Ohgami, Kakogawa; Kenichi Tochimori; Toshio Inoue, both of Hyogo, all of Japan

[73] Assignee: Kabushiki Kaisha Kobe Seiko Sho, Kobe, Japan

[21] Appl. No.: 353,101

[22] Filed: Mar. 1, 1982

[30] Foreign Application Priority Data

| | | | |
|---|---|---|---|
| Mar. 2, 1981 | [JP] | Japan | 56-29330[U] |
| Mar. 6, 1981 | [JP] | Japan | 56-32731 |
| Mar. 11, 1981 | [JP] | Japan | 56-34738 |

[51] Int. Cl.$^3$ .......... G01N 17/00

[52] U.S. Cl. .......... 73/86; 266/99

[58] Field of Search .......... 73/86; 374/7; 266/99

[56] References Cited

U.S. PATENT DOCUMENTS

| | | | |
|---|---|---|---|
| 3,236,096 | 2/1966 | Macatician et al. . | |
| 3,357,237 | 12/1967 | Le Bel | 73/86 |
| 3,367,175 | 2/1968 | Morreal et al. | 73/86 |
| 3,553,577 | 1/1971 | Stromberg et al. | 73/86 |
| 3,610,601 | 10/1971 | Bishop . | |
| 4,158,806 | 6/1979 | Kotylev et al. . | |
| 4,248,809 | 2/1981 | Sakai et al. . | |
| 4,358,953 | 11/1982 | Horiuchi | 73/86 |

*Primary Examiner*—S. Clement Swisher
*Attorney, Agent, or Firm*—Oblon, Fisher, Spivak, McClelland & Maier

[57] ABSTRACT

A probe for detecting wear of a refractory wall, including plural sheathed probe elements of different lengths each consisting of a pair of high melting point wires disposed in parallel and insulated from each other except at least the fore end portions of the wires which form a normally closed or normally open sensing point, a sheath enclosure accommodating the probe elements such that the sensing points of the respective probe elements are located at different positions along the length of the sheath enclosure and holding the probe elements in parallel relation and out of contact with each other, and a number of dummy elements formed of a material similar to the probe elements and connected to the fore ends thereof in a manner to complement the lengths of the shorter of the probe elements. There is also disclosed a detection circuit for monitoring wear of a refractory wall in a molten metal processing apparatus in a simple and accurate manner by the use of the probe.

10 Claims, 20 Drawing Figures

PROBE AND A SYSTEM FOR DETECTING WEAR OF REFRACTORY WALL

BACKGROUND OF THE INVENTION

1. Field of the Invention

This invention relates to a probe and a system for detecting wear of a refractory wall by the use of the probe.

2. Description of the Prior Art

The bodies of blast furnaces, converters and ladles which constitute a container for holding hot molten metal or for conducting vigorous metallurgical reactions at high temperature, as well as the bodies of soaking pits which internally maintain high temperatures over a long time period, generally have a lining of refractory material on the inner side of a frame or housing formed by a shell or the like. Such a lining layer is repeatedly subjected to thermal and/or mechanical shocks, and as a result it is gradually enbrittled and a worn-out refractory wall easily comes off unless a repair is made. Therefore, from the standpoint of safe operation, it is essential to hold the condition of wear of the refractory material (or the degree of persistence) constantly under strict supervision.

In this connection, the most popular method has been to estimate the condition of the refractory layer from the appearance or temperature of the outer shell, which is of course very low in accuracy. Therefore, the present inventors proposed in their Laid-Open Japanese Utility Specification No. 55-105140 a temperature distribution sensor which is capable of detecting the condition of the inner refractory wall surface with a relatively high accuracy when applied by the refractory wall wear monitoring method disclosed in Laid-Open Japanese Patent Specification No. 55-119114. However, the just-mentioned method which depends on arithmetic operations by a computer is difficult to apply readily to various kinds of refractory walls and thus lacks versatility. Of course, if a sensor which is embedded in a refractory wall is ruptured by wear of the refractory wall, it produces an abnormal output signal which could be used for the detection of the critical condition of the refractory wall in a simple method of wear detection. However, as the afore-mentioned thermal sensor utilizes a sheath type thermocouple or sheath type resistance thermometer, its output signal is essentially a temperature signal. Therefore, it is not always easy to distinguish a signal variation due to a sudden change in the furnace temperature from a variation due to the rupture of the sensor. Consequently, there are possibilities of making a detrimental error in judgement, still leaving a problem with regard to the reliability of operation.

Further, Japanese Utility Model Publication No. 53-8370 discloses a sheath type multi-point temperature probe having plural sheath type thermocouples or plural sheath type resistance thermometers formed by connecting wires of predetermined lengths to the fore ends of heat sensing points and accommodated in a protective tube with the respective heat sensing points located in different positions along the length of the protective tube, the outer diameter of the protective tube being reduced subsequently to form an integral probe assembly. This probe assembly differs from the above-mentioned sensor in that it uses no insulating material between the sheath and protective tube and the material which constitutes the thermocouples of resistance thermometers is not used at the heat sensing points.

Under these circumstances, the present inventors furthered their studies in search for simpler and more reliable means which is capable of accurately detecting the condition of wear of refractory walls, and as a result succeeded in developing a novel probe which will be described hereinlater, and a detection circuit which is suitably used in combination with the probe. This detection circuit differs from ordinary disconnection detecting means which are generally arranged to detect an abnormal state by way of a variation in the resistance across a detecting element which shows different values in shortcircuited and disconnected states. For example, means for detecting an abnormal state of a thermocouple are disclosed in Laid-Open Japanese Patent Application Nos. 55-60828 and 55-117982, Japanese Utility Model Publication No. 55-11456 and Laid-Open Japanese Utility Model Application No. 54-102167. However, if these known detecting means are applied to a molten metal processing system such as blast furnace or converter, the abnormal state is often overlooked as a variation in resistance is very small even in the event of a wire breakage, due to slag deposition at the end of the detecting element, or the molten pig iron or molten steel which contacts the end of the detecting element creates a shortcircuited state despite the presence of a wire breakage, showing only a slight variation in resistance.

In view of these problems, the present inventors endevored to develop a detection circuit which can detect even an instantaneous variation in resistance which may take place by occurrence of an abnormal state, and succeeded in obtaining a novel detection circuit of satisfactory performance characteristics.

In this connection, a mention may be made of DE-OS 2,005,399 disclosing a device for monitoring wear of a refractory layer, which however has to be improved in a number of points before application as a detecting means in an actual operation and lacks practicality. More specifically, this monitoring device has a difficulty in that it requires boring many holes in the refractory wall itself and laying detection wires in the refractory bricks before building the wall, coupled with the problem of reliability arising from the limited number of circuit systems.

SUMMARY OF THE INVENTION

The present invention contemplates to eliminate the above-mentioned difficulties and problems of the prior art, and has as its primary object the provision of a probe which can detect the degree of wear of a refractory wall in a simple and accurate manner.

It is another object of the present invention to provide a system for monitoring the wear of a refractory wall, which employs a novel refractory wall wear detection circuit in combination with the probe.

According to one aspect of the present invention there is provided a probe for detecting the degree of wear of a refractory wall, comprising: plural sheathed probe elements each consisting of a pair of high melting point wires disposed in parallel and insulated from each other except at least said fore ends of said wires forming a normally closed or normally open sensing point; a sheath enclosure accommodating said probe elements such that said sensing points of the respective probe elements are located at different positions along said length of said sheath enclosure, and holding said probe elements in parallel relation and out of contact with each other; and a number of dummy elements formed of a material similar to that of the probe elements and connected to the fore ends thereof to complement the lengths of shorter probe elements.

According to another aspect of the invention, there is provided a refractory wall wear detecting circuit for detecting wear of a refractory wall by embedding a probe therein, including a power source for supplying current to said probe element; a circuit for detecting the amount of current flowing to said probe element; a circuit for detecting said overlap voltage of said probe element; a divider adapted to produce an output voltage indicative of the ratio of said detected amount of current to said overlap voltage; a comparator adapted to compare said output voltage of said divider with a predetermined reference voltage; and an indicator circuit operated by said output voltage of said comparator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

One feature of the probe according to the present invention resides in the use of a probe element constituted by a pair of high melting point wires which are received in a sheathing in parallel relation with each other, forming a normally closed or normally open sensing point at the tip ends thereof. Another feature of the probe resides in the use of a plurality of such sheathed probe elements of different lengths which are arranged in a sheath enclosure such that the sensing points of the respective probe elements are located at different positions along the length of the sheath enclosure by the use of a number of dummy elements constituted by a material similar to the probe elements and connected to the fore ends of the respective probe elements in a manner to supplement the lengths of shorter probe elements.

Figure 1:
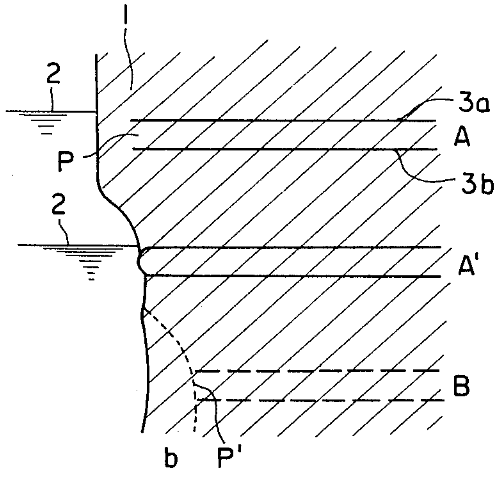
FIGS. 1 and 2 are diagrammatic views of a probe according to the invention.

Referring now to the drawings, wherein like reference numerals designate identical or corresponding parts throughout the several views, and more particularly to FIG. 1 thereof.

Figure 2:
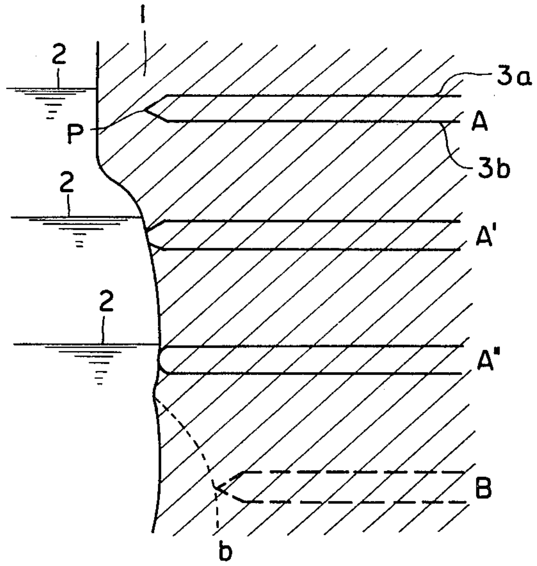

FIG. 1 diagrammatically illustrates a probe element of the invention, with a non-contacting or normally open sensing point, for explanation of its operating principles. FIG. 2 illustrates a probe element similar to the probe element of FIG. 1 but having a contacting or normally closed sensing point. Referring first to FIG. 1, a pair of high melting point wires 3*a* and 3*b* are insulatedly embedded in a refractory material 1. In a stage where the refractory wall is free of wear as indicated at A, the sensing point P of the probe element is secluded from molten metal 2. Consequently, the sensing point P undergoes no change and no current flow takes place even if a potential is applied to the wires 3*a* and 3*b*, affirming that the refractory wall is in normal state. However, if the wear of the refractory wall 1 proceeds to the stage as indicated at A', the tip ends of the wires 3*a* and 3*b* are fused off and shortcircuited as the sensing point P is exposed to the molten metal. Therefore, conduction of current abruptly occurs if a potential is applied to the two wires, and it can be estimated from the generation or increase of current that the refractory wall 1 has been worn out up to the sensing point P as indicated at A'. If the wires are embedded in a shallower position with the sensing point P' remote from the molten metal 2 as shown at B of FIG. 1, the fusing shortcircuiting of the sensing point P' takes place when the refractory wall 1 is worn out to the position indicated by broken line b. It follows that, if a number of probe elements are embedded with the respective sensing points at different positions across the width of the refractory wall 1, the fusing shortcircuiting takes places from an inner sensing point, making it possible to know exactly the current extent of wear of the refractory wall 1.

The normally closed probe element of FIG. 2 operates essentially on the same principles as in the non-contacting element of FIG. 1. More particularly, when the refractory wall 1 is in a sound state as shown at A of FIG. 2, current flows through the sensing point P. However, the sensing point P is thermally affected by the approaching molten metal 2 and finally fused off, breaking the current flow through the sensing point P. Therefore, it can be assumed that the wear of the refractory wall 1 has proceeded to the stage of A' should the value of current flow across the wires 3*a* and 3*b* abruptly drop or become zero. If the wear proceeds a little more as shown at A'', the probe element is put in the same condition as at A' of FIG. 1 and current is conducted again. In the case of FIG. 2, therefore, it is possible to know that the wear has proceeded to the stage A' or A'' by detecting a disconnection which takes place between the conducting stages A and A'', which is a disconnection of an extremely short time period or an instantaneous disconnection in most cases. The broken lines B and b indicate the same conditions as in FIG. 1.

The foregoing description counts on the existence of molten metal within the refractory wall 1. However, the wires at the sensing point are melted off as long as a high temperature environment prevails within the refractory wall and likewise undergo the fusing disconnection and connection which can be utilized as signals in the wear detection. Thus, the probe element of the present invention is applicable not only to molten metal containers such as blast furnaces, converters and the like, but also to furnaces in general which hold a high temperature atmosphere like soaking pits. In the case of molten metal containers, the temperature of the molten metal varies considerably depending upon the kind of metal. The furnace temperature in other high temperature containers also varies depending upon the purpose and conditions of the operation and upon the position of measurement. Therefore, the wire elements to be used in the present invention should have a high melting point to ensure that they are fused only when they are exposed in a furnace and should be selected from a suitable material in consideration of the conditions of the furnace and the mounting position. Although the wires are defined to have a high melting point in the present invention as a greatest common factor, materials of different melting points may be used according to the purposes for which they are intended to serve. As a matter of course, a selected wire material should not be a non-conductor and is preferred to be relatively free of the thermal influences of the refractory wall the temperature of which is varied considerably depending upon the furnace conditions. Consequently, the wire material is preferred to be low in the value of the dependency of electrical resistance on temperature (the thermal coefficient of electrical resistance). In addition, it is recommended to form the paired wires 3a and 3b from the same material.

Figure 3:
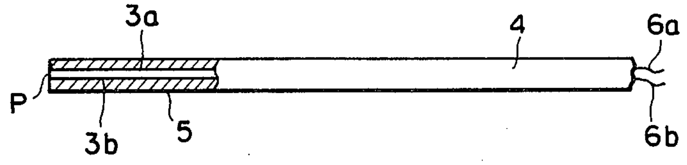
FIG. 3 is a partly cutaway side view of a probe element according to the invention.

Now, the construction of the probe according to the present invention is described in greater detail. Referring to FIG. 3 showing a probe element of the invention in a partly cutaway side view, a pair of wires 3a and 3b which satisfy the above-mentioned conditions are disposed in a sheathing in parallel relation with each other. These wires are of an alloy material with a high melting point and a high electrical resistance, for example, of chromel, alumel or constantan which have properties and chemical composition as shown in Table I below.

TABLE I

| Alloy | Chemical composition (%) Ni | Cr | Al | Mn | Si | Cu | Melting point (2°C.) | Dependency on temperature of electrical resistance ($R_{1000}/R_0$) |
|---|---|---|---|---|---|---|---|---|
| Chromel | 90 | 10 | — | — | — | — | 1,427 | 1,365 |
| Alumel | 95 | — | 2 | 2 | 1 | — | 1,399 | 2,150 |
| Constantan | 45 | — | — | — | — | 55 | 1,220 | 1,092 |

Note
$R_{1000}$: Electrical resistance at 1,000° C.
$R_0$: Electrical resistance at 0° C.
$R_{1000}/R_0$: Thermal coefficient of electrical resistance The wires 3a and 3b are insulated from each other by a refractory insulating material 5 like magnesia which also serves to suppress heat transfer in the longitudinal direction of the probe element. The paired wires 3a and 3b which are held in or out of contact with each other at the fore sensing point P are connected at the respective rear ends to lead wires 6a and 6b which are connected to a power source through an ammeter or other suitable measuring instrument.

Figure 4:
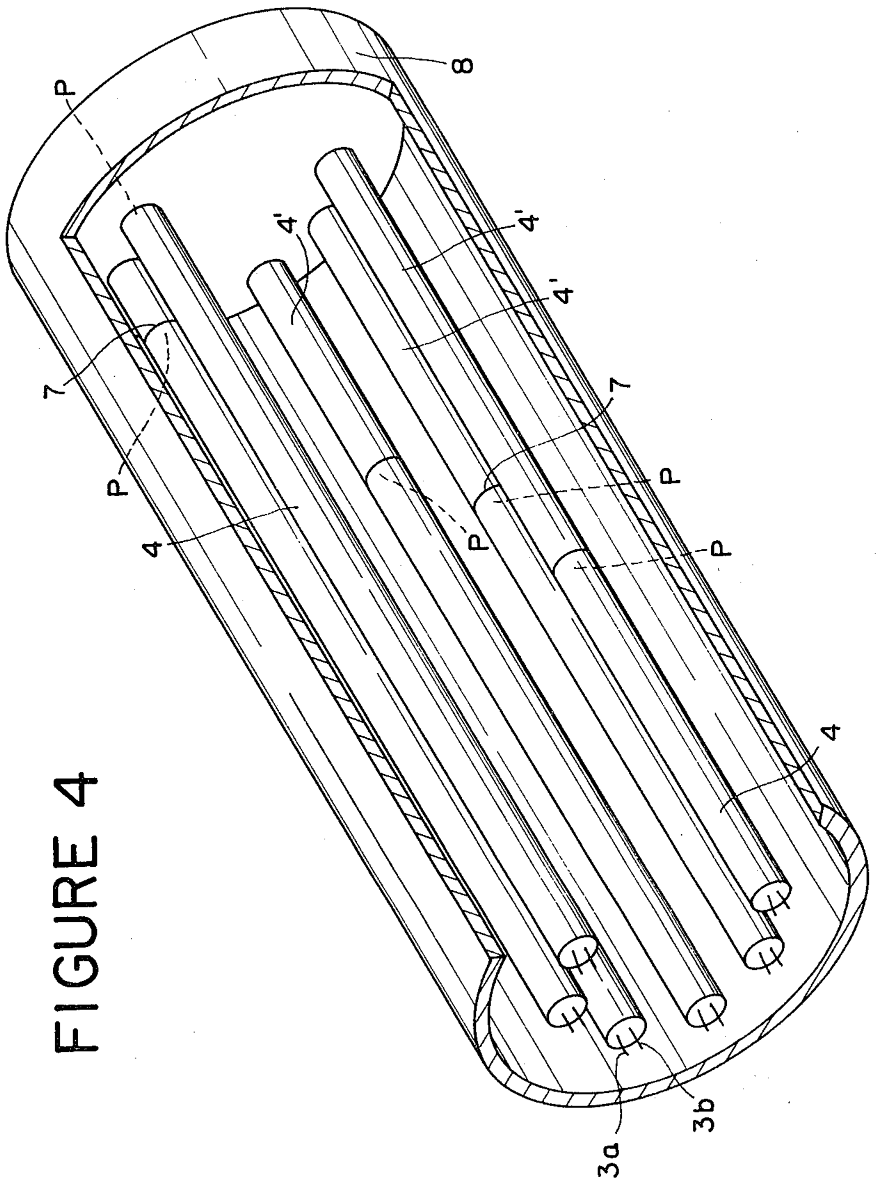
FIG. 4 is a partly cutaway perspective view of the probe according to the invention.

FIG. 4 shows a probe assembly having plural sheathed probe elements which are received in parallel relation with each other in a sheath enclosure 8 of the same material as the sheathing 4 of each probe element. The sheathings 4 of the respective probe elements are insulated from each other by a suitable refractory material like magnesia which is filled in the sheath enclosure 8 although the filler refractory material is omitted in FIG. 4 for the convenience of illustration. The probe assembly is embedded in a refractory wall of a furnace with its sensing end, the upper right-hand end in FIG. 4, on the inner side. Accordingly, the fore ends of the respective probe elements are disposed on the side of the sensing end but their sensing points P are positioned at different points along the length of the probe assembly as shown in FIG. 4. Although the sensing points P are positioned at regular intervals along the length of the probe assembly in the particular example shown, they may be located at arbitrary positions or, of course, at random if desired. However, the sensing points P are preferred to be arranged in a predetermined pattern because, in the present invention, the positions of the respective sensing points P in the refractory wall in which the probe assembly is embedded should be known exactly beforehand. Dummy elements 4' which are constituted by the same material as the probe elements 4 are interposed between the fore end of the sheath enclosure 8 and the sensing points P of shorter probe elements 4, thereby to make uniform the measuring conditions of the respective probe elements. The dummy elements 4 may or may not contain the wires 3a and 3b and, if they do, the wires are not connected to the wires 3a and 3b of the probe elements 4 as a matter of course. In FIG. 4, the reference numeral 7 denotes a connection of a probe element 4 and a dummy element 4', which can be dispensed with in a case where the sheathed probe elements are formed in uniform lenghts consisting of wired portions extending to sensing points at different positions and complementary dummy portions. In this instance, there is a possibility of the sensing point malfunctioning under the influence of furnace heat which tends to propagate toward the sensing point through the sheathing when the dummy portion is exposed to the furnace due to wear of the refractory wall. In order to suppress such thermal influence, it is necessary to increase the density of the insulating filler material in the sheathing 4.

In the embodiment shown in FIG. 4, one of six probe elements is extended through the entire length of the sheath enclosure 8 with its sensing point P located at the head end of the sheath enclosure 8 without intervention of a dummy element, for the purpose of embedding the sensing point P at a position close to the inner surface of the refractory wall. If desired, the probe elements may be accommodated in a sheath enclosure of a greater length, interposing dummy elements of greater lengths between the head end of the sheath enclosure and the sensing points P of the respective probe elements.

Since the degree of wear is detected by way of an electric signal which is produced by fusing disconnection or connection of the wires 3a and 3b, the heat transfer in the longitudinal direction of the sheathing 4 and sheath enclosure 4 should be suppressed to a maximum degree. For this purpose, it is necessary to increase the density of the refractory filler material as mentioned hereinbefore for reducing the quantity of residual air in the filler material. One method which can serve for this purpose is to subject the filled sheathing to a drawing operation (diametral reduction) to squeeze out residual air.

The probe assembly of the above-described construction indicates the degree of wear simply by electric on-off signals or abrupt changes in electrical resistance or current, without relying on temperature signals or complicated calculations and analysis by a computer, so that the detection of wear of the refractory wall can be facilitated to a significant degree. The probe assembly can be readily used on various molten metal containers or on thermal processing systems and can indicate progressive wear of a refractory wall with high precision.

When the above-described probe assembly is used for detecting wear of a refractory wall, the probe assembly is connected to a detection circuit which comprises a power source for supplying current to a probe element, a circuit for detecting the amount of current flowing to the probe element, a divider for calculating the ratio of the detected amount of current to a voltage across the ends of the probe element, a comparator for comparing the output voltage of the divider with a predetermined reference voltage, and an indicator circuit operated by the output voltage of the comparator. In a case where the power source is a stabilized constant-current power source, the detection circuit can omit the current detecting circuit and divider, and the object of the present invention can be attained simply by providing a circuit for detecting the overlap voltage of the sensing element, a comparator for comparing the detected voltage with a predetermined reference voltage, and an indicator circuit operated by the output voltage of the comparator.

The operation and resulting effects of the present invention are hereafter described more particularly by way of circuit diagrams of preferred embodiments, which however are not intended to limit the present invention in any way whatsoever, and it is to be understood that the present invention includes all the modifications and alterations or additions which may be made to the particular circuit arrangements shown by those skilled in the art in consideration of the foregoing and succeeding descriptions.

Figure 5:
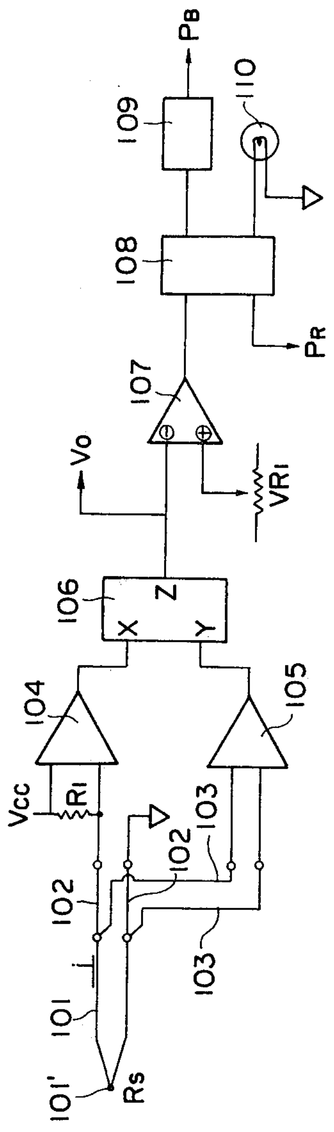
FIG. 5 is a diagram of a detection circuit according to the present invention.

Referring to FIG. 5, there is shown a detection circuit which is adapted to illuminate an indicator lamp and actuate an alarm upon detection of an instantaneous increase in resistance of a probe element 101 when its initially closed sensing point 101′ (in the normal or non-sensing stage) is fused off due to wear of a refractory wall. In this figure, indicated at 102 are current lead wires, at 103 voltage lead wires, at 104 and 105 differential amplifiers, at 106 a divider, at 107 a voltage comparator, at 108 a flip-flop, at 109 a mono-stable multivibrator, and at 110 an indicator lamp. Upon turning on a power source, the voltage Vcc rises and current i is supplied to the probe element 101 through R1. The voltage across the resistance R1 is amplified by the differential amplifier 104 with a gain Gi and supplied to the divider 106 as input X. Namely, the voltage Vx of the input X which is expressed by the following equation (1) is proportional to the amount of current flowing through the probe element 101.

$$Vx = Gi \cdot R1 \cdot i \quad (1)$$

If the resistance of sensing point 101′ is represented by Rs, the voltage V2 across the probe element 101 is expressed by the following equation (2).

$$V2 = Rs \cdot i \quad (2)$$

The voltage V2 is, after being amplified by the differential amplifier 105 with a gain Gv, supplied to the divider as input Y. Therefore, the voltage Vy of the input Y is expressed by the following equation (3).

$$Vy = Gv \cdot Rs \cdot i \quad (3)$$

On the basis of the inputs X and Y, the divider 6 performs the arithmetic operation defined by the following equation (4).

$$Vo = 10 \cdot Vy/Vx = 10 \cdot Gv \cdot Rs/Gi \cdot R1 \quad (4)$$

As will be understood therefrom, the output voltage Vo of the divider 106 is proportional to the resistance Rs of the sensing point 101′.

The output Vo of the divider is fed to voltage comparator 107 for comparison with a predetermined reference voltage Vs which is determined by a variable resistor Vr1. If the output Vo of the divider 106 is smaller than the reference voltage Vs, that is to say, when the resistance Rs of the sensing point 101′ is small, the output of the voltage comparator 107 is maintained at a high level.

Since it is unpredictable whether the output of flip-flop 108 is at high or low level upon connecting the power supply, a reset pulse PR is fed thereto as soon as the power switch is turned on as will be described hereinafter, thereby resetting flip-flop 108. Namely, referring to FIG. 6 which exemplifies a reset pulse generator circuit, the voltage Vcc rises upon turning on the power switch and capacitor C starts charging through resistance R, so that the voltage across capacitor C rises with a delay of time constant RC. In this instance, as the voltage across capacitor C remains low immediately after the rise of the supply voltage Vcc, the output PR of two Schmit trigger inverters 111 is maintained at a low level. Upon lapse of a time corresponding to the time constant RC, the output PR turns to high level. Thus, flip-flop 108 is reset by the low level signal which appears at the output terminal of Schmit trigger inverters 111.

The indicator lamp 110 and mono-stable multivibrator 109 which are lit or operated by the output signal of flip-flop 108 are in off state when the power switch is turned on.

If the sensing point 101′ of the probe element 101 which is embedded in a refractory wall is exposed due to wear of the refractory wall, the initially shortcircuited sensing point 101′ is fused off and opened but it is not completely opened due to slag deposition and exhibits a certain limited resistance. Consequently, current flow through the probe element 101 is reduced, increasing the voltage across the sensing point 101′.

In this connection, it is difficult to detect accurately a slight variation in resistance by the conventional disconnection detecting circuits which are arranged to detect only a variation in overlapped voltage. Besides, a serious problem is encountered in the conventional overlapping detection method in that the detection sensitivity is considerably lowered by an increase in resistance of the sensing point 101′, coupled with a problem that the output is markedly varied by fluctuations in the supply voltage Vcc as will be explained hereafter.

Figure 7:
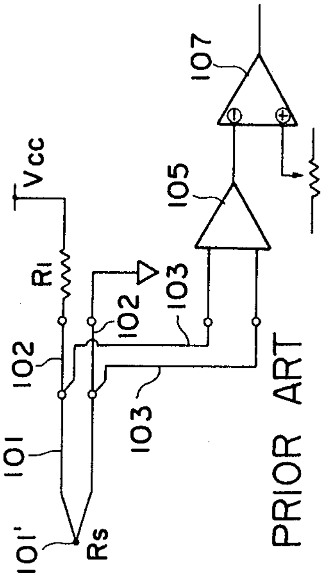
FIG. 7 is a circuit diagram showing a conventional disconnection detecting method.

FIG. 7 is a circuit diagram incorporating the conventional overlap voltage detection circuit, in which the supply voltage differential amplifier 104 and divider 106 of FIG. 5 are omitted, applying to comparator 107 only the current which is received through lead wires 103 after amplification to detect variations in voltage of the sensing point 101'. With this circuit arrangement, the input voltage Vvi of the differential amplifier 105 is expressed by the following equation (5).

$$V_{vi} = V_{cc} \cdot \frac{R_s}{R_1 + R_s} \quad (5)$$

And, if it is amplified by the differential amplifier 5 with a gain Gv, its output Vvo is expressed by the following equation (6).

$$V_{vo} = G_v \cdot V_{cc} \cdot \frac{R_s}{R_1 + R_s} \quad (6)$$

In this instance, the output sensitivity against variations in resistance of the sensing point 101' can be obtained by differentiating equation (6) with respect to the resistance Rs, as expressed by the following equation (7).

$$\frac{\partial V_{vo}}{\partial R_s} = G_v \cdot V_{cc} \cdot \frac{R_1}{(R_1 + R_s)} \quad (7)$$

As clear from equation (7), the detection sensitivity in the conventional overlap voltage method is varied with the supply voltage Vcc. The sensitivity is lowered markedly as the resistance of the sensing point Rs is increased. Consequently, it becomes necessary to set the resistances at particular values at the sacrifice of interchangeability of the probe element.

In contrast, as obvious from equation (4), the detection circuit of the present invention, which is shown in FIG. 5, is arranged to delete the influence of the supply voltage by the arithmetic operation which is performed by the divider 106 on the basis of X- and Y-inputs. Therefore, fluctuations in the supply voltage do not appear in the output of the divider 106. Besides, as clear from the following equation (8) which expresses the output sensitivity relative to the resistance Rs of the sensing point, differentiating equations (4) and (6) with respect to the resistance Rs, $$\frac{\partial V_o}{\partial R_s} = 10 \cdot \frac{G_v}{G_i} \cdot \frac{I}{R_1} \quad (8)$$

the output sensitivity is influenced only by the resistance R1 which is in the power supply line and not by the resistance Rs in any way whatsoever. Namely, the detection circuit of the invention is applicable to various kinds of probe elements and constantly ensures a high detection sensitivity irrespective of changes in resistance of the probe element.

In the event the sensing point 101' of the probe element 101 is fused off, the detection circuit of FIG. 5 operates in the manner as described below.

When the sensing point 101' is of the normally shortcircuited type, it has a small resistance Rs and the output Vo of the divider 106 is maintained at a substantially constant small value. However, if the sensing point 101' is fused off by wear of a refractory wall, its resistance Rs is increased and accordingly the output Vo of the divider 106 is also increased. Therefore, its relation with the constant reference voltage Vs is inverted to turn the output of the comparator 107 to a low level. As a result, the flip-flop 108 which is set by the inverted signal produces an inverted output to illuminate the indicator lamp while actuating the mono-stable multivibrator 109 to produce a single low pulse PB.

If molten steel deposits on the fused sensing point 101', the output of the voltage comparator 107 turns to a high level substantially the same as in the shortcircuited state (before fusing disconnection) but the indicator lamp 110 remains on since the output of flip-flop 108 is not inverted until it receives a reset signal PR.

In this manner, the detection circuit of the present invention operates to detect only a variation in resistance Rs which takes place in the initial stage of the fusing disconnection of the sensing point 101', and thereafter the indicator lamp 110 is kept on even if there should occur variations in the resistance of the sensing point due to deposition of molten steel or the like. Consequently, the wear of a refractory wall at a particular position where a probe element is embedded can be known from the illuminated indicator lamp.

Figure 6:
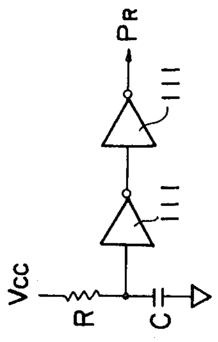
PRIOR ART FIGURE 6
FIG. 6 is a diagram of a flip-flop reset circuit.
Figure 8:
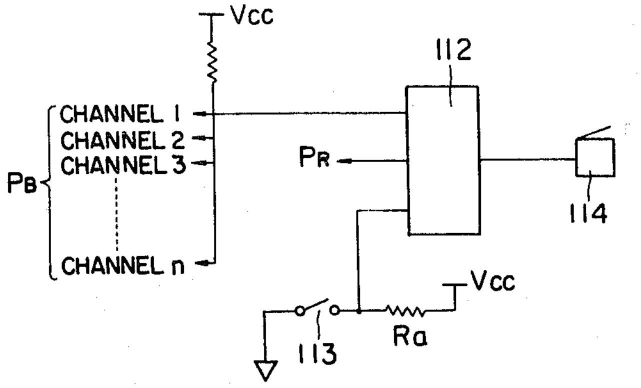
FIG. 8 is a circuit diagram exemplifying the detection circuit of the invention as connected to a wired OR circuit.

Progressive wear of a refractory wall can be monitored by providing the probe element and detection circuit of FIG. 5 in plural combinations, embedding the probe elements one after another in different positions across the width of the refractory wall and arranging corresponding indicator lamps in the same order. If plural detection circuits are connected to a wired OR circuit as shown in FIG. 8, an alarm is actuated when the indicator lamp of each circuit is illuminated. More specifically, in the circuit arrangement of FIG. 8, the single low pulse output PB of each channel is connected to a wired OR circuit so that a flip-flop 112 is set to actuate an alarm 114 whenever any one of channels 1 to n produces an output of a single low pulse. In this instance, the flip-flop 112 is reset by an output PR of a reset circuit as shown in FIG. 6 upon connection to the power source, so that the alarm 114 is not actuated until the output PB is fed to the flip-flop 112. In order to stop the alarm 114, the flip-flop 112 is reset by depressing a switch 113. Upon receipt of a next output PB, the flip-flop 112 is reset to actuate the alarm 114, and these operations are repeated to actuate the alarm 114 simultaneously with illumination of the respective indicator lamps 110.

Figure 9:
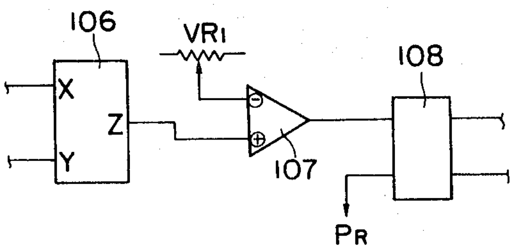
FIGS. 9 and 10 are fragmentary circuit diagrams showing modifications using a normally open detecting element.
Figure 10:
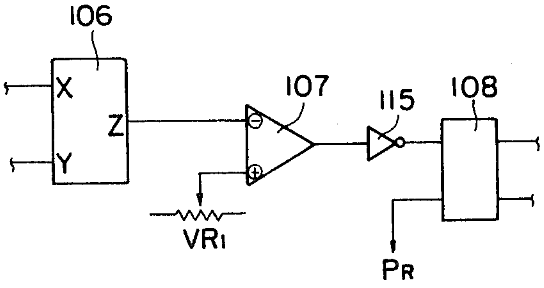

Although the illumination of a lamp or indicator lamps is the simplest method of displaying the degree of wear, it is of course possible to use in substitution therefor LED, a meter or a CRT display. In a case where a non-contacting type probe element (which is initially in open state and shortcircuited by contact with molten steel when fused off) is employed instead of the above-described contacting type probe element, the detection circuit of FIG. 5 is altered in the following manner. Since the output of the voltage comparator 107 is inverted when the contacting type probe element is replaced by a non-contacting type, it is necessary either to reverse the connection to the input terminals of the comparator 107 as shown in FIG. 9 or to insert an inverter 115 between the comparator 107 and flip-flop 108 as shown in FIG. 10.

Figure 11:
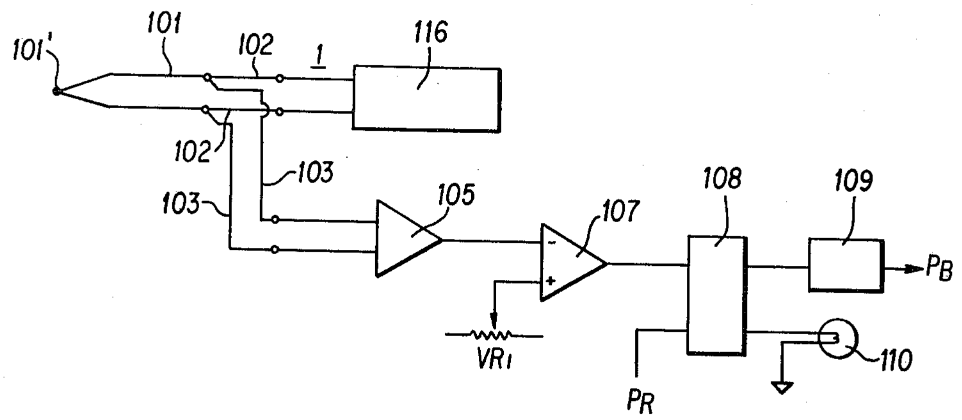
FIG. 11 is diagram of a detection circuit constituting another embodiment of the present invention.

Description is now directed to another embodiment of the detection circuit according to the present invention, which employs a stabilized constant current power source. More particularly, FIG. 11 illustrates a detection circuit which uses a stabilized constant current power source 116 for a probe element 101. In this case, since the current supply to the probe element 101 is constant, there is no need for taking into account the fluctuations in the supply current, that is to say, no need for providing a divider as shown at 106 of FIG. 5, and only a variation which occurs in the resistance of the sensing point 101' is amplified and applied to one input terminal of the voltage comparator 107. In other respects, the detection circuit operates in the same manner as in FIG. 5 to check the fusing disconnection of the sensing point 101', if any. In this embodiment, if the stabilized constant current power source 116 has an output current I, the output Vvi of the differential amplifier 105 is expressed by the following equation (9).

$$Vvi = Gv \cdot Rs \cdot I \quad (9)$$

Thus, the output Vvi of the differential amplifier 105 is also proportional to the resistance Rs of the sensing point 101', and the output sensitivity relative to variations in the resistance Rs of the sensing point, which is obtained by differentiating the output with respect to the resistance Rs, is constant as expressed by the following equation (10).

$$\frac{\partial Vvi}{\partial R_s} = Gv \cdot I \quad (10)$$

Thus, the degree of wear of a refractory wall can be detected with the same high accuracy as the detection circuit shown in FIG. 5. A number of the circuits of FIG. 11 may also be connected to a wired OR circuit as described hereinbefore with reference to FIG. 8, thereby to monitor progressive wear of a refractory wall, producing an alarm when each stage of wear is reached. In a case where a noncontacting type probe element is used, the circuit arrangement is altered as shown in FIGS. 9 and 10.

In detecting a variation in resistance of the sensing point, the present invention employs a method of detecting a voltage drop by a voltmeter-ammeter system. According to this method, the value of resistance is obtained from a ratio of a current flowing into a resistance to a voltage across a resistance to be influenced by wear, so that it suffices to measure the voltage alone if current is constant or alternatively it may be arranged to measure the current flow while maintaining the voltage constant. Any way, it is possible to secure a sufficiently high precision by a relatively simple circuit arrangement. For example, in a case where the detection system incorporates a probe element with a resistance (before fusing) of about 10–100 ohms, it shows a resistance over 300 ohms at the time of fusing disconnection and a resistance smaller than 100 ohms when shortcircuited by contact with molten steel.

As will be understood from the foregoing description, the detection circuit arrangement according to the present invention can detect even a slight variation in resistance of the sensing point of a probe element, which is reflected by a variation in voltage, reliably with a high sensitivity, permitting one to monitor accurately progressive wear of refractory wall.

Figure 12:
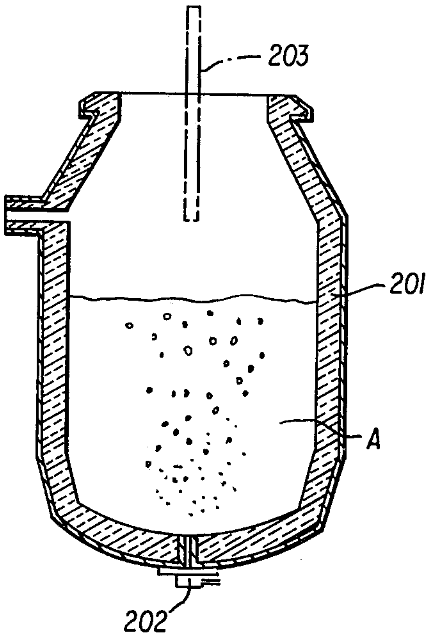
FIG. 12 is a diagrammatic vertical section of a top and bottom blown converter.
Figure 13:
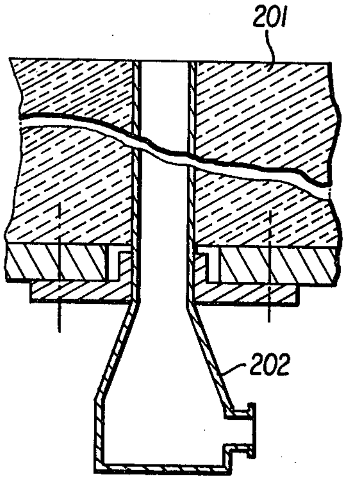
FIGS. 13 to 15 are fragmentary diagrammatic sections showing examples of gas blowing nozzles.
Figure 14:
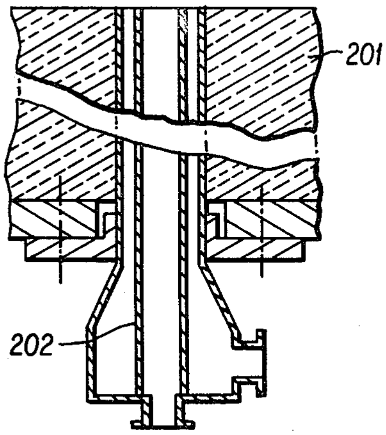
Figure 15:
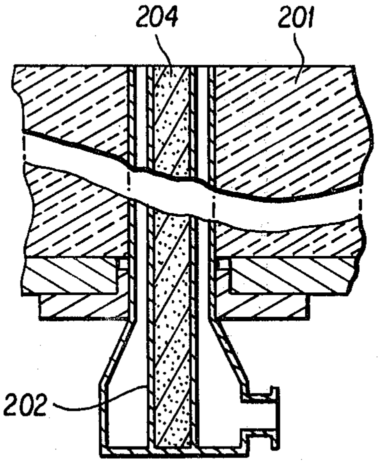

FIG. 12 illustrates, as an example of the molten metal processing apparatus to which the present invention is applicable, a converter which is provided with a bottom blowing gas nozzle at the bottom thereof. FIGS. 13 to 15 show the nozzle portion of the converter in an enlarged section. The top blowing oxygen processes which have thus far been most popular in the art of refining molten metal A in a converter 201 are now facing a possibility of being replaced by a bottom blown oxygen process which blows in oxygen through a gas nozzle 201 provided at the bottom of the converter or most probably by a top and bottom blown process which additionally blows in oxygen through a lance 203. With regard to the gas blowing nozzle 202, there are known in the art a single-tube nozzle as shown in FIG. 13 and a double-tube nozzle as shown in FIG. 14. According to our knowledge, an annular gas blowing nozzle, which has its inner tube packed with a refractory material 204 to blow in a gas through an outer tube alone a shown particularly in FIG. 15, gives better results. No matter which nozzle is used, it is necessary to blow in a gas under a pressure greater than that of the molten metal A so that the molten metal A in the vicinity of the nozzle is vigorously agitated, arousing back-attacks against up-blows. Consequently, the refractory walls in the neighborhood of the gas blowing nozzle undergo wear in a conspicuously increased degree as compared with other areas. Especially in a case where oxygen or similar gas is blown in through the nozzle 202, the metallurgical reactions take place most vigorously in an area around the nozzle 202, accelerating wear of the refractory wall in that area.

Figure 16:
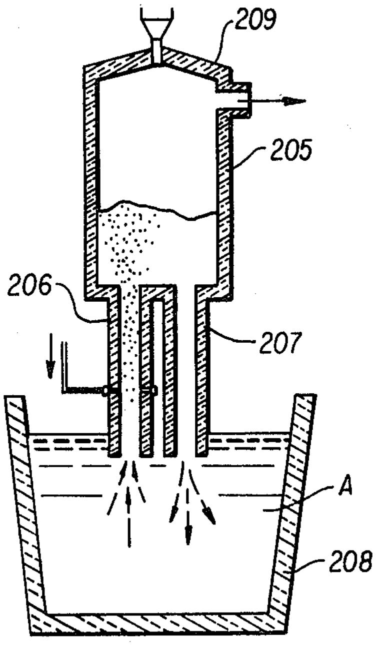
FIG. 16 is a diagrammatic view of a RH vacuum melter.

FIG. 16 shows a RH vacuum melter 205 with a riser pipe 206 and a downcomer pipe 207 at the bottom thereof immersed in molten metal A in a laddle 208. An inert gas is blown in through a nozzle 202 which is provided on the riser pipe 206 to lift up the molten metal A into the RH vacuum melter 205 by climbing gas flows for treatment therein, returning treated molten metal to the ladle 208 through the downcomer pipe 207. During the cyclic operation, the molten metal A is degassed and, if necessary, added with alloy elements which are fed through a hopper 209 at the top end of the melter for the adjustment of chemical composition. In this case, an area around the gas blowing nozzle 202, especially, an area immediately above the nozzle 202 also undergoes wear in an accelerated manner.

The probe assembly according to the present invention is particularly useful for detecting the degree of wear of the refractory wall around the gas blowing nozzle accurately from outside in these metal processing operations. As illustrated particularly in FIGS. 17 and 18, a probe assembly 210 is embedded in a refractory wall in the vicinity of a gas blowing nozzle 202 across the width of the refractory wall. Alternatively, a probe assembly is embedded in a packed refractory material of a gas blowing nozzle as shown in FIG. 19. By so doing, the dummy elements 4' and refractory filler material are eroded substantially concurrently with the wear of the refractory material, and the wires *3a* and *3b* at the sensing point P are brought into contact with the molten metal from a probe element in a succeeding position, producing a signal of a fusing shortcircuiting of the sensing point P in the case of a normally open probe element (FIG. 1) or in a fusing disconnection in the case of a normally closed probe element (FIG. 2). In response to the thus produced signal, the detection circuit illuminates a corresponding indicator lamp to inform exactly the current stage of progressive wear of the refractory wall in which the probe assembly is embedded. The dummy elements which are connected to the fore ends of the respective probe elements serve to make uniform the condition and speed of heat transfer to the heat sensing point of the individual probe elements, while preventing molten metal from attacking the probe assembly prematurely before wear of the refractory wall to reduce detection errors to a minimum.

Figure 17:
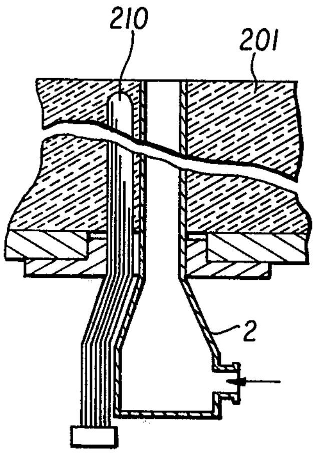
FIGS. 17 to 19 are fragmentary sectional views of gas blowing nozzle portions in other embodiments of the invention.
Figure 18:
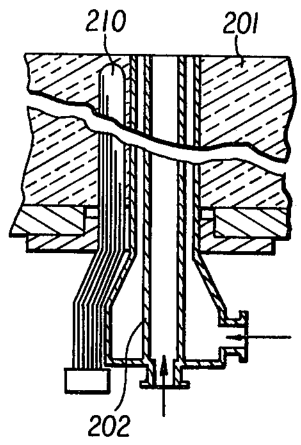
Figure 19:
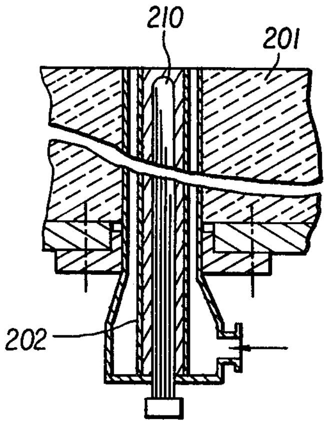

The above-described wear detection probe assembly is embedded either in a refractory filler material at the center of a gas blowing nozzle 202 or in a refractory wall portion in the vicinity of a gas blowing nozzle, as shown in FIGS. 17 to 19. However, if the probe assembly is located too close to the nozzle 202, there is a possibility of lowering its detection sensitivity due to a cooling effect of the blown-in gas. Therefore, it is preferred to embed the probe assembly at a distance of about 4–10 cm from a nozzle 202.

Thus, according to the present invention, it becomes possible to detect exactly from outside the degree of wear of a refractory wall portion in the neighborhood of a gas blowing nozzle where maximum erosion takes place in a molten metal processing system. Consequently, a temporary or more permanent repair can be made timely to prevent leakage of molten metal or other accidents and to guarantee safe operations.

The invention is illustrated more particularly by the following example.

EXAMPLE

Figure 20:
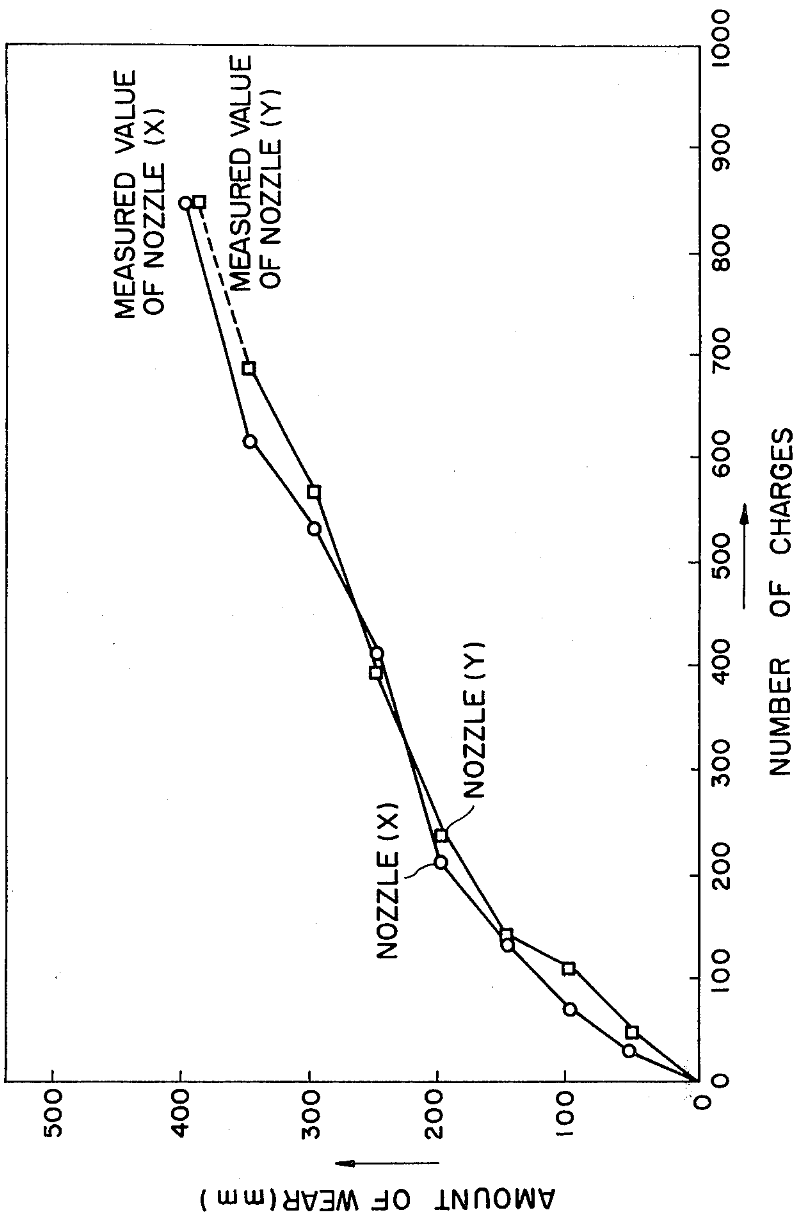
FIG. 20 is a graphic illustration of experimental data.

A pair of nozzles (X, Y) were set at the bottom of a top and bottom blown converter as shown in FIG. 19, and a wear detection probe assembly was embedded in the refractory filler material packed in the inner tube of each nozzle. The probe assembly had eight normally open probe elements with a spacing of 50 mm between the respective sensing point which were located in different positions along the length of a sheath enclosure as shown in FIG. 1. After charging molten steel into the converter, oxygen was blown in from the top through a lance while Ar gas was blown in through the bottom nozzles at a flow rate of 0.02–0.10 N·m/min·per ton of steel. The same operation was repeated to refine 845 charges of molten steel, while checking the wear of the refractory wall in the vicinity of the gas blowing nozzles by the probe assemblies. The progressive wear of the refractory wall detected by the respective probes are shown in FIG. 20.

The experiment was interrupted at the 845th charge when the 8th probe element of the probe in the nozzle Y was not yet fused off. The nozzles were extracted from the bottom of the converter and the thickness of the refractory wall was measured to confirm the extent of actual wear, which was 408 mm. As clear from FIG. 20, the extent of wear detected by the probe was 400 mm with an error as small as 2% [(40B−400)/400×100]. Thus, the probe proved to be able to detect the wear with a high accuracy.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for detecting the degree of wear of a refractory wall, comprising:

at least one probe adapted to be embedded in said wall, comprising, plural sheathed probe elements each consisting of a pair of high melting point wires, said wires exhibiting a resistance low in thermal dependence and each pair of wires being formed of the same material, said wires having fore ends, said wires disposed in parallel and insulated from each other except at least the fore ends of said wires, said fore ends of each pair of wires forming a normally closed or normally open sensing point, a sheath enclosure accommodating said probe elements such that the sensing points of the respective probe elements are located at different positions along the length of said sheath enclosure, and holding said probe elements in parallel relation and out of contact with each other, and a number of dummy elements formed of a material similar to said probe elements and connected to the fore ends thereof to complement the lengths of the shorter of said probe elements.

2. An apparatus as set forth in claim 1, comprising:

a detecting circuit coupled to said at least one probe element of said probe, comprising:

a power source for supplying current to said probe element, a circuit for detecting the amount of current flowing to said probe element, a circit for detecting the voltage across said probe element, a divider for producing an output voltage indicative of the ratio of the detected amount of current to said voltage across said probe element, a comparator adapted to compare said output voltage of said divider with a predetermined reference voltage, and an indicator circuit operated by the output voltage of said comparator.

3. An apparatus as set forth in claim 2, wherein said detecting circuit is connected to each one of plural probe elements embedded in different positions across the width of said refractory wall.

4. An apparatus as set forth in claim 1, comprising:

a detecting circuit coupled to said at least one probe element, comprising:

a stabilized constant current power source for supplying constant current to said probe element, a circuit for detecting a voltage across said probe element, a comparator for comparing said voltage with a predetermined reference voltage; and an indicator circuit operated by the output voltage of said comparator.

5. An apparatus as set forth in claim 4, wherein said detecting circuit is connected to each one of plural probe elemenets embedded in different positions across the width of said refractory wall.

6. A molten metal processing apparatus having a gas blowing nozzle at the bottom or in the wall of a furnace, said apparatus comprising:

a refractory wall wear detection probe embedded in a refractory wall in the vicinity of said gas blowing nozzle and having plural sheathed probe elements each consisting of a pair of high melting point wires, said wires exhibiting a resistance low in thermal dependence and each pair of wires being formed of the same material, said wires having fore ends and disposed in parallel and insulated from each other except at least the fore ends of said wires, said fore ends of each pair of wires forming a sensing point to detect a variation in current condition by fusing short-circuiting or disconnection thereof, a sheath enclosure accommodating said probe elements such that the sensing points of the respective probe elements are located at different positions along the length of said sheath enclosure and holding said probe elements in parallel relation and out of contact with each other, and a number of dummy elements formed of a material similar to said probe elements and connected to the fore ends thereof to complement the lengths of the shorter of said probe elements.

7. An apparatus for detecting the degree of wear of a refractory wall, comprising:

at least one probe adapted to be embedded in said wall, comprising:

plural sheathed probe elements each consisting of a pair of high melting point wires having fore ends, said wires disposed in parallel and insulated from each other except at least the fore ends of said wires, said fore ends of each pair of wires forming a normally closed or normally open sensing point, a sheath enclosure accommodating said probe elements such that the sensing points of the respective probe elements are located at different positions along the length of said sheath enclosure, and holding said probe elements in parallel relation and out of contact with each other, and a number of dummy elements formed of a material similar to said probe elements and connected to the fore ends thereof to complement the lengths of the shorter of said probe elements; and a detecting circuit coupled to said at least one probe element of said probe, comprising, a power source for supplying current to said probe element, a circuit for detecting the amount of current flowing to said probe element, a circuit for detecting the voltage across said probe element, a divider for producing an output voltage indicative of the ratio of the detected amount of current to said voltage across said probe element, a comparator adapted to compare said output voltage of said divider with a predetermined reference voltage, and an indicator circuit operated by the output voltage of said comparator.

8. An apparatus as set forth in claim 7, wherein said detecting circuit is connected to each one of plural probe elements embedded in different positions across the width of said refractory wall.

9. An apparatus for detecting the degree of wear of a refractory wall, comprising:

at least one probe adapted to be embedded in said wall, comprising:

plural sheathed probe elements each consisting of a pair of high melting point wires having fore ends, said wires disposed in parallel and insulated from each other except at least the fore ends of said wires, said fore ends of each pair of wires forming a normally closed or normally open sensing point, a sheath enclosure accommodating said probe elements such that the sensing points of the respective probe elements are located at different positions along the length of said sheath enclosure, and holding said probe elements in parallel relation and out of contact with each other, and a detecting circuit coupled to said at least one probe element, comprising:

a stabilized constant current power source for supplying constant current to said probe element, a circuit for detecting a voltage across said probe element, a comparator for comparing said voltage with a predetermined reference voltage; and an indicator circuit operated by the output voltage of said comparator.

10. An apparatus as set forth in claim 4, wherein said detecting circuit is connected to each one of plural probe elements embedded in different positions across the width of said refractory wall.

* * * * *

UNITED STATES PATENT AND TRADEMARK OFFICE
CERTIFICATE OF CORRECTION

PATENT NO. : 4,442,706

DATED : APRIL 17, 1984

INVENTOR(S) : YOSHIO KAWATE ET AL

It is certified that error appears in the above-identified patent and that said Letters Patent is hereby corrected as shown below:

Column 1, line 46, delete "afore-mentioned" and insert therefor --aforementioned--;

Column 2, line 30, delete "endevored" and insert therefor --endeavored--;

Column 3, line 49, delete "a" (second occurrence) and insert therefor --an--;

Column 5, line 49 (Table), please omit the "2" in "(2°C.)";

Column 6, line 35, delete "with in" and insert therefor --within--;

Column 6, line 36, delete "lenghts" and insert therefor --lengths--;

Column 6, line 63, delete "sheath enclosure 4" and insert therefor --sheath enclosure 8--;

UNITED STATES PATENT AND TRADEMARK OFFICE

CERTIFICATE OF CORRECTION

PATENT NO. : 4,442,706

DATED : APRIL 17, 1984

INVENTOR(S) : YOSHIO KAWATE ET AL

It is certified that error appears in the above-identified patent and that said Letters Patent is hereby corrected as shown below:

Column 9, line 7, after "equation (5)" delete "." and insert --:--;

Column 9, equations 5-8, in all instances "$R_s$" should be --Rs--;

Column 9, line 27, delete "As clear" and insert therefor --As is clear--;

Column 9, line 34, delete "as obvious" and insert therefor --as is obvious--;

Column 9, line 40, delete "as clear" and insert therefor --as is clear--;

Column 11, equations 9-10, "$R_s$" should be --Rs--;

Column 11, line 44, delete "Any way" and insert therefor --Anyway--;

Column 12, line 10, delete "a shown" and insert therefor --as shown--;

UNITED STATES PATENT AND TRADEMARK OFFICE

CERTIFICATE OF CORRECTION

PATENT NO. : 4,442,706

DATED : APRIL 17, 1984

INVENTOR(S) : YOSHIO KAWATE ET AL

It is certified that error appears in the above-identified patent and that said Letters Patent is hereby corrected as shown below:

Column 12, line 26, delete "laddle" and insert therefor --ladle--;

Column 13, line 22, after "..the following example" insert --:--;

Column 13, line 31, delete "sensing point" and insert therefor --sensing points--;

Column 14, line 23, delete "circit" and insert therefor --circuit--;

Column 14, line 50, delete "elemenets" and insert therefor --elements--;

Column 14, line 66, delete "condition" and insert therefor --conduction--.

Signed and Sealed this

*First* Day of *January 1985*

[SEAL]

*Attest:*

GERALD J. MOSSINGHOFF

*Attesting Officer* *Commissioner of Patents and Trademarks*